United States Patent Office 3,278,573
Patented Oct. 11, 1966

3,278,573
PRODUCTION OF AROMATIC NITRILES USING VANADIUM OXIDE CATALYSTS ON AN ALUMINA CARRIER
Hugo Kroeper, Heidelberg, Rolf Platz, Mannheim, and Heinz Nohe and Rudi Schanz, Ludwigshafen (Rhine), Germany, assignors to Badische Anilin- & Soda-Fabrik Aktiengesellschaft, Ludwigshafen (Rhine), Germany
No Drawing. Filed May 20, 1963, Ser. No. 281,761
Claims priority, application Germany, May 23, 1962, B 67,362
3 Claims. (Cl. 260—465)

This invention relates to the production of aromatic nitriles, particularly dinitriles. More specifically, the invention relates to the use of new supported catalysts for the production of aromatic nitriles from aromatic hydrocarbons, oxygen and ammonia.

A process for the production of aromatic nitriles by catalytic oxidation of alkyl-substituted aromatic hydrocarbons with ammonia and oxygen at elevated temperature in the vapor phase is known in which an alumina that contains vanadium oxide and chromium oxide and has been heated to 1,000° to 1,500° C. prior to application of the metal oxides, is used as catalyst. Yields of up to 84% are achieved in the production of terephthalodinitrile by this method. When o-xylene is used, phthalimide is obtained as the main product.

It is an object of this invention to provide a process by which aromatic nitriles are obtained in higher yields than by prior art methods. Another object of this invention is to provide a process by which aromatic nitriles are obtained in higher purity than hitherto. A further object of the invention is to provide a process for the production of aromatic nitriles in which when using o-xylene as the initial material, a nitrile is obtained and only minor amounts of phthalimide are produced. Furthermore it is an object of this invention to provide a new catalyst for the production of nitriles.

These and other objects and advantages of the invention will become apparent from the following detailed description.

We have found that nitriles of aromatic carboxylic acids, particularly phthalodinitriles, are obtained from alkyl-substituted aromatic hydrocarbons by catalytic oxidation with oxygen in the presence of ammonia at elevated temperature in the vapor phase using an alumina catalyst containing vanadium oxide and chromium oxide, in higher yields and in greater purity than hitherto by using a supported catalyst containing vanadium oxide and chromium oxide whose carrier contains aluminum oxide of the γ-, δ-, η-, κ-, or χ-modification, if desired in admixture (nomenclature according to Industrial Engineering Chemistry, 42 (1950), 1398–1403).

The catalyst used for the process consists of 50 to 98% by weight, preferably 80 to 90% by weight, of carrier and vanadium oxide or a mixture of vanadium and chromium oxides applied thereto. The ratio of vanadium oxide to chromium oxide in the mixture may be widely varied. Good results are achieved with molar ratios of $V_2O_5:CrO_3$ equal to 10:1 to 1:10. Molar ratios of from 3:1 to 1:1 have proved to be especially suitable.

It is however also possible to use vanadium pentoxide alone.

The carrier according to the invention must exhibit one of the said aluminum oxide modifications. The most suitable are the γ-, δ- and η-modifications lying between 400° and 1,000° C. in the dehydration schemes of boehmite and bayerite and also mixtures of γ- and δ-, γ- and η-, δ- and θ-modifications. It is preferred to use γ- and η-aluminum oxides which have been obtained by dehydration of aluminum hydroxide at 450° to 700° C. Specific calcination temperatures are necessary for each of the different aluminum oxide modifications, for example 450° to 700° C. for $\gamma$-$Al_2O_3$, 700° to 800° C. for $\delta$-$Al_2O_3$, 800° to 1,000° C. for $\theta$-$Al_2O_3$ and 300° to 750° C. for $\eta$-$Al_2O_3$. The production of such carriers is known. The aluminum hydroxide or hydrated aluminum oxide used as initial material, for example sulfate, boehmite, highest-purity boehmite, bayerite, hydrargillite or highest-purity $\gamma$-$Al_2O_3$, is peptized in finely ground form, for example by treatment with 1 to 10% by weight of acid substances, with reference to aluminum hydroxide or hydrated aluminum oxide, such as nitric acid, aluminum nitrate, aluminum chloride or formic acid, in a kneader, then dried, broken into granules of suitable size and calcined at the appropriate temperature. The acid substance is preferably used in the form of a 20 to 50% by weight solution. Pure formic acid may also be used. It is preferred to peptize with 30 to 40% nitric acid.

It is advantageous to use catalyst carriers having internal surfaces between 20 and 300 sq.m/g., particularly between 120 and 260 sq.m./g., and having mean pore radii of 30 to 60 A. units. Such pore sizes are spontaneously set up under the said calcination conditions. It is preferred to use aluminum oxide modifications which exhibit lines having angular widths at half-maximum intensity of 1.5° to 4.0°2θ, preferably 2.0° to 3.0°2θ, in the X-ray powder pattern. Such modifications are known as modifications having "broadened lines in the X-ray powder pattern."

The breadth of the X-ray lines is expressed by the angular width at half-maximum intensity in °2θ and is determined by the particle size and crystallite size and the irregularities in the lattice structure, for example local lattice disorders. The broader the lines are, i.e., the greater the angular width at half-maximum intensity, the smaller are the particles and therefore the greater the lattice disorder.

According to Scherrer, Göttinger Nachrichten, No. 2 (1918), page 98, the following connection exists between the particle size and the breadth of the X-ray diffraction lines:

$$D = \frac{K \cdot \lambda}{\beta \cdot \sin \theta}$$

The symbols in this formula have the following meanings:

$D$ = mean length of the "particles," more exactly of the crystallite size;
$K$ = form factor whose size depends on the crystal form, on the indices of the diffraction line and on the special definition of D and $\beta$;
$\lambda$ = the wavelength of the X-rays;
$\beta$ = diffraction breadth of the line (as distinct from the purely geometrical line breadth), which is conditioned by the equipment; and
$\theta$ = diffraction angle of Bragg's equation $$n \cdot \lambda = 2d \sin \theta$$

where $n$ is the serial number of the spectrum and $d$ the lattice constant of the spectrometer and $\theta$ are as defined above.

On the other hand there is obtained for the lattice disorder $$\frac{\Delta a}{a}$$

by differentiation of Bragg's equation:

$$\frac{\Delta a}{a} = \frac{\beta}{4 \cdot \tan \theta}$$

To compound the diffraction breadth from the two components, the following equation holds good according to Dehlinger and Kochendörfer (see R. Glocker, Materialprüfung mit Röntgenstrahlen, 4th edition, 1958 Berlin, page 351):

$$\beta = \frac{\beta_D}{1 - \frac{\beta a}{4\beta_D}}$$

for $\beta_a$ less than $2\beta_D$ ($\beta$ being the total diffraction breadth) and $\beta = \beta_a$ for $\beta_a$ more than or equal to $2\beta_D$.
$\beta_D$ = line breadth due to small crystallite size
$\beta_a$ = line breadth due to local lattice disorders.

In the evaluation of the measurements, the following assumptions are made:
(1) particle size and lattice disorders determine the breadth of the X-ray lines,
(2) for the diffraction breath $\beta$, the total line breadth at half-maximum intensity which is made up in complex form from the geometric breadth and the diffraction breadth is used.

The equipment specifications are:
(1) CuK alpha radiation.
(2) Siemens goniometer with angular aperture 1.3 mm. and receiving slit 0.1 mm.
(3) 440-reflex of eta $(\eta)$-$Al_2O_3$ 440- and 404-reflexes of gamma $(\gamma)$- and delta $(\delta)$-$Al_2O_3$ (indication analogous to monoclinic $\beta$-$Ga_2O_3$).

Like the secondary structure (internal surface and pore radius), the particle size and lattice disorders are dependent on the method of production of the aluminum hydroxide, the conditions of the peptization and the calcining temperature of the aluminum hydroxide.

In order to achieve reproducible results, it is recommended to test the catalyst for X-ray diffraction lines, internal surface and mean pore radius.

The catalysts may be prepared by applying the vanadium pentoxide and the chromium trioxide in the conventional way to the carrier, for example by impregnating it with vanadium or vanadium-chromium solutions, then drying the catalyst and heating it for some time, for example one to twenty hours, for example at 200° to 500° C., preferably to 400° C., in a current of air immediately prior to use. Suitable metal salt solutions are ammonium vanadate, vanadyl sulfate or vanadyl oxalate solutions, or suspensions of vanadium pentoxide in which the vanadium pentoxide is brought into solution by adding oxalic acid or ammonia, and suitable chromium solutions are chromium chloride, chromium sulfate, chromium trioxide and chromium oxalate solutions, advantageously of 10 to 30% by weight strength.

Conventional oxidation conditions may be used for the process.

Benzenes or naphthalenes which bear one or more, for example three, alkyl groups may be used as initial materials. Benzonitrile is obtained from toluene or ethylbenzene, and phthalodinitriles are obtained from the xylenes. Alkylbenzenes having longer alkyl side chains, for example having up to four carbon atoms, may also be used, but the process is then less economical.

Trimesic acid trinitrile is obtained from mesitylene and the corresponding naphthalenecarboxylic acid nitriles from alkylnaphthalenes; for example 1-naphthonitrile from 1-methylnaphthalene or 1,8-naphthalene dicarboxylic acid dinitrile from 1,8-diethylnaphthalene. Alkyldiphenyls may also be used, for example 3,4-dimethyldiphenyl, phenylphthalodinitrile then being obtained.

The ratio of hydrocarbon to oxygen and ammonia may be seen from the equation:

It is advantageous however to use an excess of oxygen, for example 1.5 times the amount theoretically necessary, and an excess of ammonia of about ten to fifteen times the amount theoretically necessary.

Since good results are achieved with gas mixtures having a content of 0.5 to 3% by volume of hydrocarbons, the proportions of the other reactants, for example ammonia, must be raised equivalently. Dilution with inert gases may also be carried out, for example by using air as the gas supplying oxygen, or by diluting the gas mixture with inert gases, for example with nitrogen.

The reaction is carried out between 300° and 500° C., advantageously between 380° and 460° C. It is recommended, especially when making o-phthalodinitrile, to maintain temperatures between 400° and 450° C. because the content of phthalimide and phthalic diamide decreases with rising reaction temperature. Whereas at a reaction temperature of 380° C., the imide and diamide content of the product is higher than 10%, a 99.5 to 99.8% dinitrile can be prepared at a reaction temperature of 440° to 450° C. so that a subsequent purification and separation of imide and diamide is not necessary.

The period of contact of the gas mixture with the catalyst may be varied within wide limits, for example between 0.1 and 25 seconds and it preferably amounts to about 0.5 to 5 seconds. In the case of particularly active catalysts, for example having gamma-$Al_2O_3$ (600° C. calcination temperature) as the carrier, an increase in the yield can be achieved at temperatures above 420° C. by shortening the contact period from 1 second to 0.5 second, while in the case of the less active catalysts having $\chi$- and $\kappa$-$Al_2O_3$ as the carrier, variation of the contact period between 2 seconds and 0.5 second has no effect on the yield.

The catalyst may be rigidly arranged but it is preferred to keep it in fluidized motion.

The process is usually carried out at atmospheric pressure. It may however also be carried out at a slightly reduced pressure, for example 400 mm. Hg, or slightly elevated pressure, for example up to 2 atmospheres gauge.

The reaction may be carried out for example by passing the gas mixture at the reaction temperature over the catalyst, then cooling the reaction gas and separating the nitriles by condensation, if desired by spraying in water. In view of the great purity of the product, a separate purification thereof for the removal of imide and amide formed is unnecesary in many cases.

The following examples describe first the production of catalysts and then the results of oxidation with the various catalysts.

A. Production of catalysts

Peptized aluminum hydroxide, for example sulfate-boehmite, highest-purity boehmite, bayerite, hydrargillite or highest-purity $\gamma$-$Al_2O_3$, is ground to a grain size of 0.1 to 0.4 mm. and calcined at the desired temperature.

The carrier thus obtained is impregnated with an aqueous solution containing a vanadium-chromium salt until the desired weight ratio of carrier to vanadium oxide-chromium oxide has been reached. The catalyst is then dried at 110° C., kept at 400° C. for seven hours in a muffle furnace and then fluidized for sixteen hours in a current of air at 400° C.

The following carriers are used in the examples of the production of dinitrile given later in this specification:

| Initial material | Calcination temperature, °C. | Modification of Al$_2$O$_3$ | Internal surface, sq. m./g. | Mean pore radius, A. units | Angular width at half-maximum intensity °2θ |
|---|---|---|---|---|---|
| 1. Sulfate-boehmite (with strongly broadened lines in the X-ray powder pattern; impurities about 0.5%): | | | | | |
| (a) AlO(OH) | 500 | γ | 262.5 | 50.1 | 3.57 |
| (b) AlO(OH) | 600 | γ | 178.5 | 42.5 | 2.54 |
| (c) AlO(OH) | 700 | γ | 160.4 | 54.8 | 2.10 |
| (d) AlO(OH) | 800 | δ | 124.0 | 59.9 | 2.02 |
| 2. Highest-purity (with less strongly broadened lines in the X-ray powder boehmite pattern; impurities less than 0.0005%): | | | | | |
| (a) Highest-purity boehmite | 500 | γ | 121.5 | 69.8 | 1.62 |
| (b) Highest-purity boehmite | 600 | γ | 101.4 | 75.4 | 1.55 |
| 3. Highest-purity (with broadened lines in the X-ray powder pattern; bayerite impurities less than 0.01%): | | | | | |
| (a) Al(OH)$_3$ | 500 | η | 175.5 | 44.0 | 1.77 |
| (b) Al(OH)$_3$ | 600 | η | 157.1 | 47.75 | 1.76 |
| (c) Al(OH)$_3$ | 700 | η | 137.5 | 52.5 | 1.74 |
| (d) Al(OH)$_3$ | 800 | η→θ | 127.4 | 56.5 | 1.70 |
| 4. Bayerite (with less strongly broadened lines in the X-ray powder pattern; impurities about 0.1%): | | | | | |
| (a) Bayerite | 500 | η(+γ) | 300.2 | 37.7 | 1.69 |
| (b) Bayerite | 600 | η(+∼30%γ) | 233.5 | 43.9 | 1.65 |
| (c) Bayerite | 700 | η(+γ) | 151.0 | 81.6 | 1.34 |
| 5. Hydrargillite: | | | | | |
| (a) Hydrargillite | 600 | χ | 226.8 | 26.8 | (1) |
| (b) Hydrargillite | 800 | χ | 93.5 | 83.9 | (1) |

[1] Not measured.

In each case, 503 g. of this carrier is impregnated with a solution which has been prepared as follows:

59.6 g. of vanadium pentoxide in 250 cc. of water and 33.3 g. of chromium trioxide in 170 cc. of water are separately reduced at 90° C. by adding oxalic acid, the solutions united and 200 cc. of water added. This liquid should be completely absorbed by the carrier. The impregnated carrier is then heated as described above.

The catalyst thus obtained has the following composition: 10% of V$_2$O$_5$, 5.6% of CrO$_3$, 84.4% of Al$_2$O$_3$, atomic ratio of V:Cr=2:1.

Catalysts having the following compositions are prepared by an analogous method:

| No. | V$_2$O$_5$ percent | CrO$_3$ percent | γ—Al$_2$O$_3$ percent | Atomic ratio of V:Cr |
|---|---|---|---|---|
| 6 | 2.5 | 11.2 | 86.3 | 1:3 |
| 7 | 10 | 2.8 | 87.2 | 3:1 |
| 8 | 5 | 11.2 | 83.8 | 1:2 |
| 9 | 1.3 | 0.7 | 98 | 2:1 |
| 10 | 10 | Nil[1] | 90 | (1) |
| 11 | 17 | 8 | 75 | ? |

[1] No Cr.

B. *Production of the aromatic nitriles*

200 cc. of finished catalyst is heated to the reaction temperature in a vertical reactor by external electrical heating. 75 l. of ammonia, 150 l. of nitrogen and 75 l. of air are passed upwardly per hour through the catalyst. The hydrocarbon, for example xylene, is converted into vapor in an evaporator and introduced into the current of gas. The gas mixture maintains the fluidization of the catalyst. The nitrile is separated from the reaction product first by condensation and then by washing out with water.

The catalysts are identified in the following table by numbers; numbers 1 to 5 refer to the carriers bearing these numbers, but provided with the mixture of vanadium oxide and chromium oxide; numbers 6 to 11 refer to the catalysts having these numbers given above.

*Production of phthalodinitriles*

Xylene is evaporated at the rate of 15 g. per hour and passed with a gas mixture over the catalyst. The gas mixture has the following composition:

1.2% by volume of xylene,
25% by volume of ammonia,
5% by volume of oxygen and
68.8% by volume of nitrogen.

The contact period is 0.8 to 1.5 seconds except in the experiments marked * where the contact period is 0.5 second. Conversion is complete in all cases. Column C identifies the catalyst, T is the reaction temperature in ° C., Yo, Ym and Yp give the yields of o-, m- and p-phthalodinitrile based on o-, m- and p-xylene, respectively, and I gives the percentage of imide in the o-phthalodinitrile.

| C | T | Yo | Ym | Yp | I |
|---|---|---|---|---|---|
| 1(a) | 380 | 59 | | | 7 |
| | 400 | 64 | | | 3.5 |
| | 410 | 64 | | | 2.5 |
| | 420 | 65 | | | 1.5 |
| | 440 | 64 | | | [1] 1 |
| | 450 | 62 | | | <1 |
| 1(b) | 380 | 63 | | | 13 |
| | 400 | 67 | 77 | 86 | 3 |
| | 410 | 66 | | | 2.5 |
| | 420 | 66 | | 85 | 2 |
| | *420 | 70 | | | <1 |
| | *440 | 70 | | | |
| | *450 | 72 | | | |
| 1(c) | 380 | 62 | | | 15.5 |
| | 400 | 66 | | | 5 |
| | 410 | 65 | 77 | 84 | 2.5 |
| | 420 | 67 | | | 2 |
| | 430 | 68 | | | 1 |
| | 440 | 62 | | | <1 |
| 1(d) | 380 | 61 | | | 16 |
| | 400 | 66 | | | 5 |
| | 410 | 65 | | | 4.5 |
| | 420 | 68 | | | 3 |
| | 440 | 56 | | | 2 |
| | 450 | 53 | | | <1 |
| 2(a) | 380 | 52 | | | 20 |
| | 400 | 52 | | | 7.5 |
| | 420 | 54 | | | 7 |
| | 440 | 49 | | | 6 |
| 2(b) | 400 | 52 | | | 7 |
| | 420 | 51 | | | 6 |
| | 440 | 40 | | | 2 |
| 3(a) | 380 | 62 | | | 12.5 |
| | 400 | 66 | | | 5 |
| | 420 | 64 | | | 2 |
| | 440 | 55 | | | [1] 1 |
| | 450 | 50 | | | <1 |
| 3(b) | 380 | 65 | | | 15.5 |
| | 400 | 68 | 76 | | 6 |
| | 410 | 67 | | | 5 |
| | 420 | 64 | | 85 | 3.5 |
| | 440 | 53 | | | <1 |
| | 450 | 51 | | | |
| 3(c) | 380 | 38.5 | | | 17 |
| | 400 | 57 | | | 8 |
| | 410 | 52 | | | 7 |
| | 420 | 47 | | | 7 |
| | 440 | 38 | | | 4 |
| | 450 | 37 | | | 3 |
| 3(d) | 380 | 49 | | | 15 |
| | 400 | 57 | | | 10 |
| | 420 | 52 | | | 5 |
| | 380 | 51 | | | 10 |
| 4(a) | 400 | 53 | | | 7 |
| | 420 | 54 | | | 5 |
| | 440 | 50 | | | 3 |

| C | T | Yo | Ym | Yp | I |
|---|---|----|----|----|---|
| (b) | 400 | 62 | | | 6 |
| | 410 | 61 | | | 4 |
| | 420 | 63 | | | 3 |
| | 440 | 55 | | | 1 |
| | 450 | 50 | | | <1 |
| (c) | 380 | 51 | | | 10 |
| | 400 | 54 | | | 4 |
| | 420 | 59 | | | 4 |
| | 440 | 58 | | | 3 |
| 5(a) | 380 | 73 | | | 25 |
| | 400 | 57 | | | 16 |
| | 410 | 55 | | | 12 |
| | 420 | 53 | | | 10 |
| | 440 | 35 | | | 7.5 |
| (b) | 380 | 60 | | | 14 |
| | 400 | 53 | | | 5 |
| | 410 | 50 | | | 3 |
| | 420 | 47 | | | 2 |
| 6 | 400 | 40 | | | 5 |
| | 420 | 32 | | | 4 |
| | 440 | 26 | | | 2 |
| 7 | 400 | 60 | | | 10 |
| | 420 | 62 | | | 3 |
| | *440 | 64 | | | 1.5 |
| 8 | 400 | 52 | | | 7.5 |
| | 420 | 52 | | | 3 |
| | *440 | 45 | | | 1 |
| 9 | 400 | 8.5 | | | 3.5 |
| | 420 | 15 | | | 2 |
| | *440 | 21 | | | 1 |
| 10 | 400 | 62 | | | 6 |
| | 420 | 63 | | | 5 |
| | *440 | 63 | | | 1 |
| 11 | 400 | 63 | | | 6 |
| | 420 | 64 | | | 3 |
| | *440 | 66 | | | 0.5 |

*Approximate.

When using a gas mixture having the composition 2.7% of o-xylene, 10% of oxygen and 87.3% of ammonia, a contact period of 0.5 second, a reaction temperature of 400° C. and catalyst 1(b), 65 mole% of o-phthalodinitrile is obtained (with reference to xylene) having a content of phthalimide and phthalodiamide of less than 0.5%.

*Production of benzonitrile*

Mixture supplied: 11% by volume of toluene, 7.5% by volume of oxygen, 6.5% by volume of ammonia and 75% by volume of nitrogen.

| Catalyst | Reaction temperature, °C. | Yield of benzonitrile, mole percent | Conversion in Percent |
|---|---|---|---|
| 1(b) | 400 | 67 | 82 |
| 1(c) | 400 | 70 | 80 |
| | 410 | 75 | 75 |

We claim:
1. A process for the production of aromatic nitriles which comprises contacting
   (a) an aromatic hydrocarbon selected from the group consisting of alkyl-substituted benzenes with 1 to 3 alkyl groups of 1 to 4 carbon atoms, alkyl-substituted naphthalenes with 1 to 2 alkyl groups of 1 to 4 carbon atoms and alkyl-substituted diphenyl with 1 to 2 alkyl groups of 1 to 4 carbon atoms,
   (b) oxygen and
   (c) ammonia at a temperature of from 300° to 500° C. and at a pressure of from 400 mm. Hg to 2 atmospheres with a catalyst consisting substantially of a member selected from the group consisting of vanadium oxide and a mixture of vanadium oxide and chromium oxide, said catalyst being supported on an alumina carrier made up of a member selected from the group consisting of $\gamma$-alumina, $\delta$-alumina, $\eta$-alumina, $\kappa$-alumina, $\chi$-alumina, and mixtures of $\gamma$-alumina and $\delta$-alumina, $\gamma$-alumina and $\eta$-alumina, $\delta$-alumina and $\vartheta$-alumina, said alumina carrier being prepared from at least one mineral of the group consisting of boehmite, bayerite and hydrargillite, which alumina carrier shows lines having angular widths at half-maximum intensity of 1.5° to 4.0° $2\theta$.

2. A process as claimed in claim 1 in which said alumina carrier has an inner surface of from 20 to 300 m.$^2$/g. and a mean pore radius of from 30 to 60 A. units.

3. A process as claimed in claim 1 in which a catalyst is used in which the molar ratio of vanadium pentoxide to chromium oxide is from 3:1 to 1:1.

*Production of other nitriles*

| Mixture supplied in percent by volume | Catalyst | Reaction temperature, °C. | End product | Yield, mole percent | Conversion, percent |
|---|---|---|---|---|---|
| 11 toluene, 7.5 oxygen, 6.5 ammonia, 7.5 nitrogen. | 1(b) | 400 | Benzonitrile | 67 | 82 |
| | 1(c) | 400 | do | 70 | 80 |
| | 1(c) | 410 | do | 75 | 75 |
| 0.7 diisopropylbenzene, 12.4 ammonia, 9.9 oxygen, 77 nitrogen. | 1(c) | 400 | Terephthalodinitrile | 55 | |
| 0.85 3,4-dimethyldiphenyl, 5.1 oxygen, 33.75 ammonia, 60.3 nitrogen. | 1(b) | 420 | 4-phenylphthalodinitrile | 70 | 99 |
| 0.9 1-methylnaphthalene, 4.4 oxygen, 25.7 ammonia, 69 nitrogen. | 1(b) | 420 | 1-naphthonitrile | 61 | 80 |
| 0.9 mesitylene, 6.2 oxygen, 30.9 ammonia, 62 nitrogen. | 1(b) | 420 | Trimesic acid trinitrile [1] | 50 | 100 |

[1] By-products: Small amounts of isophthalodinitrile, monomethyldicyanobenzene and dimethylomonocyanobenzene.

References Cited by the Examiner

UNITED STATES PATENTS 2,987,538  6/1961  Gasson _____ 260—465

OTHER REFERENCES

Mahan et al., abstract of application Serial No. 120,606, published June 5, 1961.

Russell Alumina Properties, Technical Paper No. 10, 1953, Aluminum Co. of America, Pittsburgh, Pa.

CHARLES B. PARKER, *Primary Examiner.*

DALE R. MAHANAND, *Assistant Examiner.*

UNITED STATES PATENT OFFICE
CERTIFICATE OF CORRECTION

Patent No. 3,278,573　　　　　　　　　　　　October 11, 1966

Hugo Kroeper et al.

It is hereby certified that error appears in the above numbered patent requiring correction and that the said Letters Patent should read as corrected below.

Columns 5 and 6, in the table, first column, line 8 thereof, for "Highest-purity" read -- Highest-purity boehmite --; same table, same column, line 13, for "Highest-purity" read -- Highest-purity bayerite --; same table, third column, line 10 thereof, for "$\eta \rightarrow \theta$" read -- $\eta \rightarrow \vartheta$ --; column 5, in the table, heading to the fourth column, for "$A._2O_3$" read -- $Al_2O_3$ --.

Signed and sealed this 5th day of September 1967.

(SEAL)
Attest:

ERNEST W. SWIDER　　　　　　　　　　　　EDWARD J. BRENNER
Attesting Officer　　　　　　　　　　　　Commissioner of Patents